(12) United States Patent
Newman et al.

(10) Patent No.: US 11,658,486 B2
(45) Date of Patent: May 23, 2023

(54) ENERGY CONTROL FOR ENERGY STORAGE SYSTEMS

(71) Applicant: Honeywell International Inc., Morris Plains, NJ (US)

(72) Inventors: Rhett Heath Newman, Newtown (AU); Mark Bertinetti, Killara (AU); Dynish Padinjarenjarukulathel Kurian, Lindfield (AU); David Barry Granatelli, Rozelle (AU)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 126 days.

(21) Appl. No.: 17/226,525

(22) Filed: Apr. 9, 2021

(65) Prior Publication Data
US 2021/0359522 A1    Nov. 18, 2021

Related U.S. Application Data

(60) Provisional application No. 63/025,483, filed on May 15, 2020.

(51) Int. Cl.
*H02J 3/32* (2006.01)
*H02J 13/00* (2006.01)
(Continued)

(52) U.S. Cl.
CPC .............. *H02J 3/32* (2013.01); *G05B 13/048* (2013.01); *H02J 3/381* (2013.01); *H02J 7/0047* (2013.01);
(Continued)

(58) Field of Classification Search
CPC ............ H02J 3/32; H02J 3/381; H02J 7/0047; H02J 7/0071; H02J 13/00002; H02J 13/00006;
(Continued)

(56) References Cited

U.S. PATENT DOCUMENTS 9,671,843 B2    6/2017  Ellis et al.
9,760,956 B2    9/2017  Magnussen et al.
(Continued)

FOREIGN PATENT DOCUMENTS

CN    102496948 B    9/2014
CN    109709910 A    5/2019
(Continued)

OTHER PUBLICATIONS

Canadian Office Action dated May 30, 2022, issued in connection with Canadian Application No. 3,117,684 (6 pages total).
Extended European Search Report dated Oct. 15, 2021; issued in connection with corresponding EP Application No. 21172140.2 (7 pages total).

*Primary Examiner* — Mohammad Ali
*Assistant Examiner* — Dhruvkumar Patel
(74) *Attorney, Agent, or Firm* — John Maldjian; Stevens & Lee PC (57) ABSTRACT

An energy control system (ECS) for controlling an energy storage system (ESS's) that includes energy storage devices(s) or an energy storage combination (ESDC's) including ≥1 of the energy storage devices and ≥1 of the energy storage combinations. A power conversion system is coupled to an output of the ESDC, and a transformer is coupled to an output of the power conversion system. The ECS includes an ECS server and an ESS adapter configured for providing an interface between ECS server and the ESS. The ECS server is configured for reading status data from the ESS and submitting schedules including selected charging and discharging times to the ESS, monitoring or displaying a variance between an expected performance of the ESS based on the schedules and an actual ESS performance, (Continued)

and responsive to the variance being determined to be above a predetermined threshold, sending an update of the schedules to the ESS.

18 Claims, 8 Drawing Sheets

(51) Int. Cl.
*H02J 7/00* (2006.01)
*G05B 13/04* (2006.01)
*H02J 3/38* (2006.01)
*H02J 15/00* (2006.01)

(52) U.S. Cl.
CPC ...... *H02J 7/0071* (2020.01); *H02J 13/00002* (2020.01); *H02J 13/00006* (2020.01); *H02J 15/003* (2013.01); *H02J 2300/24* (2020.01); *H02J 2300/28* (2020.01)

(58) Field of Classification Search
CPC .............. H02J 15/003; H02J 2300/24; H02J 2300/28; H02J 3/004; H02J 3/003; G05B 13/048; Y02B 90/20; Y02E 10/20; Y02E 10/56; Y02E 60/00; Y02E 60/16; Y02E 70/30; Y02P 90/50; Y04S 10/50; Y04S 20/12; Y04S 40/12
See application file for complete search history.

(56) References Cited

U.S. PATENT DOCUMENTS

| | | | |
|---|---|---|---|
| 10,291,034 B2 | 5/2019 | Kimura et al. | |
| 2017/0126032 A1* | 5/2017 | Beaston | H02J 3/32 |
| 2017/0237259 A1* | 8/2017 | Yoon | H02J 3/003 |
| | | | 307/20 |
| 2017/0324246 A1* | 11/2017 | Sato | H02J 3/381 |
| 2017/0371306 A1 | 12/2017 | Sossan et al. | |
| 2019/0331084 A1* | 10/2019 | Fridrich | H02J 7/0013 |
| 2019/0341782 A1* | 11/2019 | Trifonov | H02J 7/0068 |

FOREIGN PATENT DOCUMENTS

| | | | | |
|---|---|---|---|---|
| GB | 2505415 A | * | 3/2014 | ............. F03B 13/06 |
| KR | 10-2019-0112441 A | | 10/2019 | |
| KR | 20190120593 A | * | 10/2019 | |
| KR | 20190112441 A | * | 3/2020 | |
| WO | 2017022000 A1 | | 2/2017 | |

* cited by examiner

BESS Summary

- ⓘ 0
- ⚠ 1
- ▽ 0

Total Energy Available: 4,084.08 MWh

Current Ontario Date | Time (EST): 15 Jul 2020 | 9:16 AM

Next Ontario Peak Predicted for: 16 Jul 2020 | 04:00PM - 5:00PM

Schedule: [Create]

100 — 08:15 — 0 — 09:15

Running Commands (3)

Scheduled Commands (3)

| Control Lock | State | Owner | Level | Schedule for | Start Date & Time | Run Time | End Time | Mode | Setpoint | Delta Energy (MWh) | Errors | Edit Schedule |
|---|---|---|---|---|---|---|---|---|---|---|---|---|
| | ☑ | #1 | Zone | Toronto | 15 Jul 2020 12:00 PM 📅 | 2.00 | 02:00 PM | % SoC | 30.0 | -10.37 ↗ | | ✎ |
| 🔒 | ☑ | Honeywell | Regional | Ontario | 15 Jul 2020 11:00 PM 📅 | 8.00 | (+1 day) 07:00 AM | % SoC | 100.0 | 27.84 ↗ | | |
| 🔒 | ☑ | Honeywell | Regional | Ontario | 16 Jul 2020 03:45 PM 📅 | 2.00 | 05:45 PM | % Rate of Discharge (-) | 100.0 | -31.90 ↗ | | |

Sites (1)

| Site | Zone | Utility | Battery Size | Comms Status | Battery Temp. (°C) | Owner | Current Schedule | Sched. Status | Battery State | Current SOC (%) |
|---|---|---|---|---|---|---|---|---|---|---|
| ⚠ Tasty Cereal ⊙ Oakville | Toronto ⊙ Ontario | Oakville Hydro | 2.00MW/ 4.00MWh | Marginal ⊖ | 66.2 | #1 ⊙ D. Smith | #1 - Zone - Toronto | ⊘ | Ready — | 85.0 |

PCS (1)

| Inverter | Equipment Real Power (MW) | Reactive Power (VAr) | Frequency (Hz) | AC Voltage (V) | DC Power (kW) |
|---|---|---|---|---|---|
| PCS #1 | 0.89 | -0.1 | 80.01 | 277/277/278 | 140 |

Stacks (12)

| Stacks | Availability | Stack Temperatures (°C) | AC Voltage (V) | DC Power (kW) |
|---|---|---|---|---|
| Stack #1 | ⊘ Ready | 10.4 | 2800 | 140 |
| Stack #2 | ⊘ Ready | 10.5 | 2800 | 140 |

ENERGY CONTROL FOR ENERGY STORAGE SYSTEMS

CROSS-REFERENCE TO RELATED APPLICATIONS

This application claims the benefit of Provisional Application No. 63/025,483 entitled "ENERGY CONTROL FOR ENERGY STORAGE SYSTEMS", filed May 15, 2020, which is herein incorporated by reference in its entirety.

FIELD

This Disclosure relates to control of energy or electric storage systems.

BACKGROUND

Electricity storage is needed to smooth out variable loads and maintain reliability, particularly for renewable energy generation-based systems which have a significant weather dependence that can cause interruptions in the electricity supply. If renewable electricity generated from renewable energy sources is stored, the stored electricity can then be utilized at later times (such as during the nighttime in the case of solar energy sources) when there is no current energy generation. An energy storage system (ESS) is known to include a pumped hydropower electricity storage (PHES) system also known as pumped storage hydroelectricity (PSH) storage system, a thermal storage system, a battery-based energy storage system (BESS), or an ESS that is based on mechanical storage devices. Energy storage can be deployed both on the electricity (or power) grid, or remote from the grid including at an individual consumer's home or at a business location.

A PHES system is a known type of hydroelectric energy-based storage system used by electric power systems for load balancing. The PHES-based method stores energy in the form of the gravitational potential energy of water, that is pumped from a lower elevation reservoir (or lake) to a higher elevation reservoir. At times of low electrical demand, excess electrical generation capacity is generally used to pump water into the upper reservoir. When there is higher electricity demand, the water is released back into the lower reservoir through a water driven turbine, thus generating electricity when needed.

Although the losses of the water pumping process makes the PHES system a net consumer of energy overall, the PHES system increases revenue by selling more electricity during periods of peak demand, when electricity prices are generally the highest. If the upper reservoir collects significant rainfall or is fed by a river, then the PHES system may be a net energy producer in the manner of a traditional hydroelectric plant.

Batteries can also function as energy storage devices for a BESS, where the batteries are available in various types including lithium ion, lithium polymer, ultra-capacitors, and double layer capacitors. Also diverse are the applications in which such batteries find use. These uses include island systems and off-grid/rural electrification with renewable energy deployment, households with photovoltaics (PVs), variable renewable energy smoothing and energy supply shifting, and relatively fast, short-term electricity balancing.

A BESS comprises batteries and associated infrastructure, including a container, battery management system (BMS), and power electronics. A BESS is also known to be commonly involved in integrating and accelerating renewable energy deployment including making the energy generated by a solar or wind farm dispatchable and more controllable. When the power grid is being used at its maximum capacity, the energy generated by the solar or wind farm can be temporarily stored in the battery packs of the BESS. At a later time, the energy from the battery packs can be dispatched and sold. A BESS also helps to smoothen short term variations in the energy productions due to changing weather conditions. A BESS can also be used in applications that have no renewable component.

Figure 1:
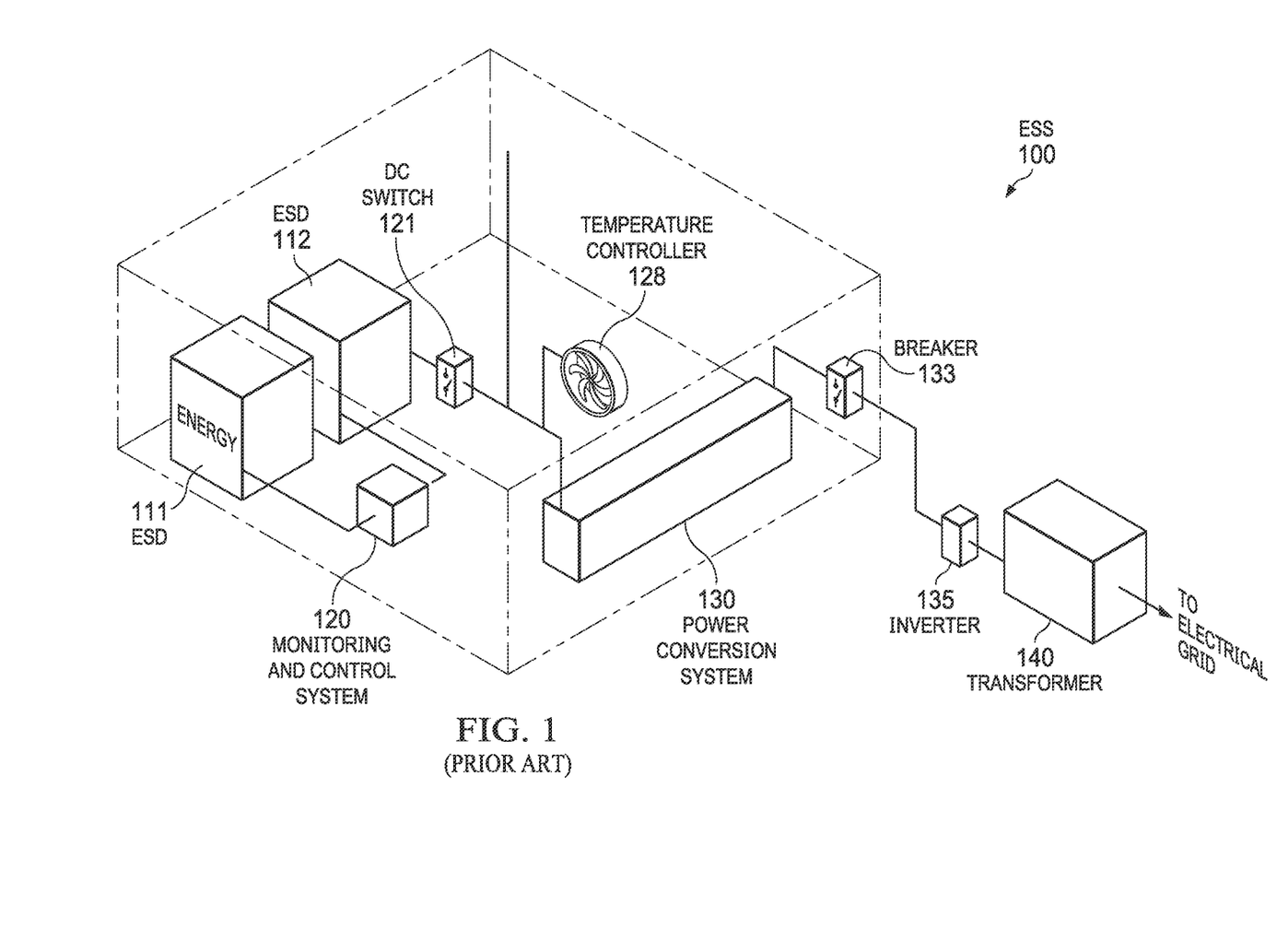
FIG. 1 shows a conventional ESS with its respective components.

FIG. 1 shows a conventional ESS 100 with its respective components. The ESS 100 comprises a plurality of energy storage devices (ESDs) shown as ESD 111 and ESD 112, which in the case of a BESS each ESD comprises a plurality of battery packs. ESS 100 includes a monitoring and control system 120, sometimes referred to as an ESS management system, which comprises a controller as well as sensors and actuators that are coupled to the ESD's 111, 112. ESS 100 further includes a power conversion system 130 that generally comprises a DC-DC power converter, and for certain ESS such as BESS also generally includes a DC-AC converter shown as an inverter 135, which has an output that is connected to a transformer 140. In the case the ESD's 111 and 112 comprise battery packs, the battery packs comprise a plurality of individual cells connected (generally connected in series to raise the voltage) into a plurality of battery modules which are then connected together to provide the battery packs. The battery packs generally comprise rechargeable batteries.

The components of the ESS 100 can vary widely depending on the type of ESS, such as battery-based storage vs. hydropower-based storage. For example, hydropower-based ESS does not require an inverter 135 because the turbine is designed for directly generating AC power. In general, there will be a monitoring and control system 120 no matter what type of energy storage arrangement is utilized in the ESS 100.

The monitoring and control system 120 is configured to ensure safety and maximize the performance of the ESS 100. The monitoring and control system 120 is responsible for controlling the operation of the DC switch 121 that is positioned between the ESD's 111, 112 and the power conversion system 130, the temperature controller 128, and the circuit breaker 133 that is shown between the power conversion system 130 and the inverter 135. The responsibilities of the monitoring and control system 120 will vary depending on the type of the ESS 100. In general, however, the monitoring and control system 120 will manage the overall operation of the components of the ESS 100.

In this case the ESD's 111, 112 comprise battery packs, the monitoring and control system 120 thus prevents individual cells in the battery packs from overcharging, and also controls the charging and discharging of the battery packs. This is important for the safety and performance of the ESS 100 when the ESS comprises a BESS. Again, in the case of a BESS, battery cells and component monitoring may vary to some degree, in that different battery types are known to require different emphasis on particular issues. For example, lithium-ion battery packs are known to need thermal monitoring and controls given their tendency to overheat.

An output from the power conversion system 130 is shown coupled through the circuit breaker 133 to the inverter 135 which generates AC power from DC power received, where power conversion system 130 can generally trigger the inverter 135 providing an adjustable frequency. Even when inversion is needed so that the inverter 135 is included in the ESS 100, the power conversion system 130 can also provide the DC to AC conversion to avoid the need for a separate inverter 135. The transformer 140 is configured to generally step up the level of the AC voltage, generally to a kV level root mean square (rms) voltage level. The stepped-up voltage is then generally provided to a power grid (a power grid is not shown in FIG. 1, but see FIG. 3A and FIG. 3B described below).

It is known for the monitoring and control system 120 to control the power conversion system 130, the inverter 135 if present, and also the transformer 140 shown in FIG. 1, and to control the operation of a single model of battery whether at a single BESS (or a plurality of BESS) that is provided by a particular battery manufacturer based on a predetermined charging and discharging schedule. Such a schedule can generally only automatically charge and discharge the battery pack(s) at a predefined rate and at predefined starting times, although a battery manufacturer may implement some functionality to allow flexible scheduling for their own BESS's.

SUMMARY

This Summary is provided to introduce a brief selection of disclosed concepts in a simplified form that are further described below in the Detailed Description including the drawings provided. This Summary is not intended to limit the claimed subject matter's scope.

Disclosed aspects recognize the problem in the example case of a BESS is that commercially available from battery suppliers generally does not serve the herein recognized need for relatively complex charging and discharging schedules for battery-based energy storage across at least one BESS, that can include different battery types and different BESS capabilities. For ESS's in general, the characteristics of different types of ESS will generally be significantly different.

Even regarding the specific case of battery-based energy storage, the differences provided by disclosed aspects is regarding the BESS's themselves, rather than the battery packs. Typically, a BESS having a plurality of battery packs will only use battery packs of one type, such as lithium-ion batteries. Disclosed aspects are generally not concerned with specifics regarding the plurality of battery packs, but rather in the case of a plurality of ESS's where each of the respective ESS under energy control system (ECS) control by a disclosed monitoring and control system can be of a different type, thus having different performance characteristics.

Disclosed aspects include what is termed herein an ECS that is referred to as a battery ECS (BECS) in the specific case of battery-based storages, where the ECS manages the charging and discharging scheduling generally for at least one ESS, and generally for a plurality of ESS. In the case of a BESS, as described above, commercially available battery offerings do not provide this disclosed management of the scheduling demands of multiple users.

Disclosed ECS are configured to connect to a monitoring and control system of ESS's, such as shown as the monitoring and control system 120 in FIG. 1 described above, so that the ECS does not replace the monitoring and control system. A disclosed ECS instead interfaces with the monitoring and control system of at least one ESS, and generally interfaces with a plurality of ESS, and thus does not directly control the energy storage devices such as battery packs, or energy storage combinations such as PHES systems.

The ECS is configured to send schedules (the timing) for charging and discharging to the monitoring and control system of the ESS('s), and it is the function of the monitoring and control system to implement the schedules it receives, where the ECS functions as a centralized controller configured to meet the need of controlling the ESS('s) for a range of different use cases, such as demand charge reduction, demand response, and frequency regulation. Charging and discharging schedules can also be created for any future time. The energy generator at the ESS can comprise a renewable energy source, such as comprising a wind farm or a solar farm.

Disclosed aspects include an ECS for controlling an ESS(s) that includes at least one energy storage device or an energy storage combination (collectively referred to as an 'ESDC'). There is at least one of i) a plurality of the energy storage devices and ii) a plurality of energy storage combinations.

A power conversion system is coupled to an output of the ESDC, and a transformer is coupled to an output of the power conversion system. The ECS includes an ECS server and an ESS adapter configured for providing an interface between ECS server and the ESS. The ECS server is configured for reading status data from the ESS and for submitting schedules including selected charging and discharging times to the ESS, and monitoring or displaying a variance between an expected performance of the ESS based on the schedules and an actual ESS performance. Responsive to the variance being determined to be above a predetermined threshold, an update of the schedules is sent to the ESS.

DETAILED DESCRIPTION

Disclosed aspects are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the aspects disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

A disclosed ECS in the case of a BECS is designed to overcome the limitations of commercially available offerings from battery suppliers by allowing more flexible control of either a single ESS or a plurality of ESS's, where there can be variations in the respective ESS's being controlled. For example, again in the case of a BESS, the respective BESS may be from different battery suppliers, the BESS may be located at multiple different physical locations, and the BESS may have battery packs that differ in capacity, chemistry, rates of charge, and may have battery packs that differ in the number of cycles and safe operating conditions, such as the temperature that may be read out by a temperature sensor.

In the case the ESS comprises a PHES system(s), the ESS comprises a gravitational potential energy-based arrangement including upper and lower reservoirs, where the respective PHES systems generally each have different energy storage capacities. There can also be a mix of different PHES system types that can be controlled by a single disclosed ECS.

A disclosed ECS enables multiple users by supporting functions such as schedule locking. Schedule locking is used herein refers to users creating their own charging and/or discharging schedules that can be 'locked' such that other users may not edit or overwrite the schedule (other than generally by an administrator). Disclosed aspects include the ability for the scheduling system to allow multiple users to interact with the plurality of ESS simultaneously and to provide visibility to each other user's schedules, and to also send notifications to other users when their schedule has been overridden.

Disclosed ECS are believed to be unique in that they create a centralized control system for ESS's that allows a user to more efficiently monitor and control the charging and discharging scheduling generally at multiple ESS. In the particular case of BESS, the respective BESS can have battery packs with different sizes/capacities, chemistries, charge rates manufacturers, and locations. Disclosed ECS enable more efficiently responding to peaks in energy demand by schedules for discharging and charging the ESDC's, at the right times to reduce their energy costs. Disclosed ECS also enable owners of ESS to exploit time-based energy pricing. Charging and discharging schedules can be issued to a plurality of ESS, rather than to each ESS individually, meaning schedules for each ESS can be sent in a single operation, thus at the same time, where the content of the schedules for the respective ESS can be the same or different, thereby streamlining the workflow of issuing schedules.

As noted above, disclosed ECS can be applied to ESS powered by renewable power generators, such as solar and wind farms, to prevent curtailment, provide grid stability, and optionally also for the complete control of charging and discharging that may be associated with the wind and solar farms. Uses of disclosed ECS are not limited to ESS powered by renewable power generators applications, such as wind and solar farms. There are multiple other use cases that can be enabled by a disclosed ESS, including 'firming' which is used herein refers to being able to provide energy outside the times of available solar and wind power, load levelling, peak shaving, ramp rate control, and demand response.

Figure 2:
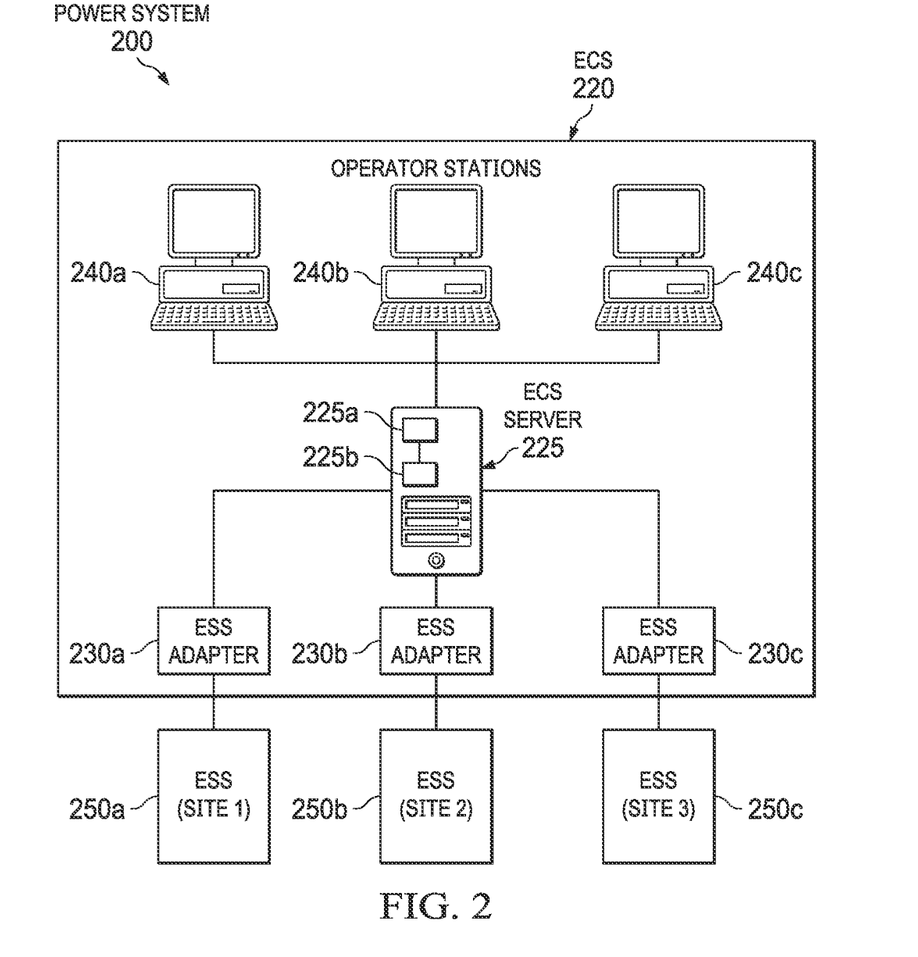
FIG. 2 shows a portion of a power system that includes an example ECS that is shown by example controlling a plurality of ESS's, according to a disclosed aspect.

FIG. 2 shows a portion of a power system 200 that includes an example ECS 220 that is shown by example controlling a plurality of ESS each located at a plurality of different physical locations, shown as ESS 250a at site 1, 250b at site 2, and 250c at site 3. For disclosed aspects, the number of ESS can be as low as one, but generally includes a plurality of ESS's.

The ECS 220 comprises an ECS server 225 that is shown interfacing with a plurality of ESS adapters shown as 230a, 230b and 230c, where a single ESS adapter is coupled each of the respective ESS 250a, 250b, and 250c. The ESS adapters are generally implemented as software components that can be run by the ECS server 225. The ECS 220 can communicate with the ESS 250a, 250b, and 250c using a variety of methods of deployment. For example, the ECS Server 225 and the ESS adapters 230a-c can each run in the cloud. Connection back to ESS at individual ESS's 230a-c can be wired (e.g., a cable connection) or wireless (e.g., a cellular network). In another example, the ECS Server 225 runs in the cloud and ESS adapters 230a-c run at each ESS 250a-c. In this case the ESS adapters 230a-c can run on hardware components, such as on an industrial remote terminal unit (RTU). In yet another example, the ECS server 225 is a software component that can be deployed in the cloud, or be deployed on-premises of the ESS 250a-c. In all of the above-described examples, it may also be the case that there are multiple ESDC's at the same physical location.

The ECS server 225 is configured to read status data from sensors at each of the ESS 250a, 250b, and 250c, and to submit charging and discharging schedules to each ESS. As noted above, besides current schedules, schedules can also be created for any future time. As with a conventional server, the ECS server 225 includes at least one computing device that comprises a processor (such as a microprocessor) 225a having an associated memory 225b, and generally includes a plurality of computing devices and a plurality of associated memory devices.

The ECS server 225 includes a software component for implementing disclosed aspects. The software component can be run on a standard operating system (OS) platform, or can be deployed as firmware on a specific hardware device for managing schedules and monitoring any variance between an expected performance of the respective ESS based on the charging and discharging schedules and an actual performance of the respective ESS. Schedules may optionally be generated by operators at the operator stations 240a, 240b, 240c using a UI screen at the operator station, or may be automatically generated by algorithms stored in the memory 225b associated with the ECS server 225.

The UI at the operator stations 240a-c can provide an at-a-glance overview of the plurality of ESS 250a-c, and can highlight when an ESS is operating outside of safety limits or when the ESS is not operating per the expected schedule. The energy storage of any ESS type can be presented in a normalized list, so in the case of a BESS the operator at the operator stations 240a-c does not need to have a good understanding of the differences of the storage/battery types in order to have a broad understanding of the status of each of the plurality of BESS.

For example, the ECS server 225 can generate battery schedules indicating when to charge and when to discharge the battery packs based on predictions of peak energy use for an electrical grid being serviced. The ECS server 225 can also automatically detect excess energy production from renewable power sources such as wind and solar generators to enable beginning charging the battery packs or other ESDC's. Moreover, the ECS server 225 can also automatically detect a drop in solar and wind energy being used to trigger a discharge of the right amount of energy from the ESDC's to maintain a level supply of energy from the renewable energy sources. Having control of ESDC's across multiple ESS means the ECS server 225 can also use utilized for the ESS to store or to provide energy. This can be an example of advanced load levelling.

The ESS adapters 230a, 230b and 230c normalize the interface between ECS server 225 and the ESS 250a, 250b, 250c. ESS adapters 230a, 230b and 230c generally communicate with the ESS server 225 using the particular communication protocol preferred by each of the ESS 250a, 250b, 250c. Schedules can be submitted by the ECS Server 225 to the ESS adapters 230a, 230b and 230c, and the ESS adapters 230a, 230b and 230c can be used send the appropriate signals to the monitoring and control system of the ESS's. The adapters 230a, 230b and 230c thus send the relevant signals to the ESS's to implement the schedule. Each type of ESS will generally be sent its own specific set of signals, where the purpose of the adapters 230a, 230b and 230c is to match the expectations of the ESS to each ESS 250a, 250b, 250c at the appropriate time as indicated by the schedule.

Optional operator stations 240a, 240b, 240c provide a UI for human operators to monitor the status across the various ESS. The operators can also generally create/edit/remove schedules, and have the ECS 220 forward the schedules to the respective ESS. ESS status data and schedule data may be stored in the cloud. More generally, the data and schedules can be stored in any location accessible by the ECS 220. For cloud implementations of ECS 220, the data and schedules will generally be stored in the cloud. For on-premises ECS 220 deployments, the data and the schedules can be stored in the cloud, or on-premises of the ESS.

In the case where the ECS 220 is optionally fully automated, an operator station may not be a needed component. In this case, the schedules are automatically generated and submitted to the ESS's 250a-250c. When included, the operator stations 240a-240c may provide a level of monitoring of the automated schedules so that human intervention can occur if deemed needed.

Figure 3A:
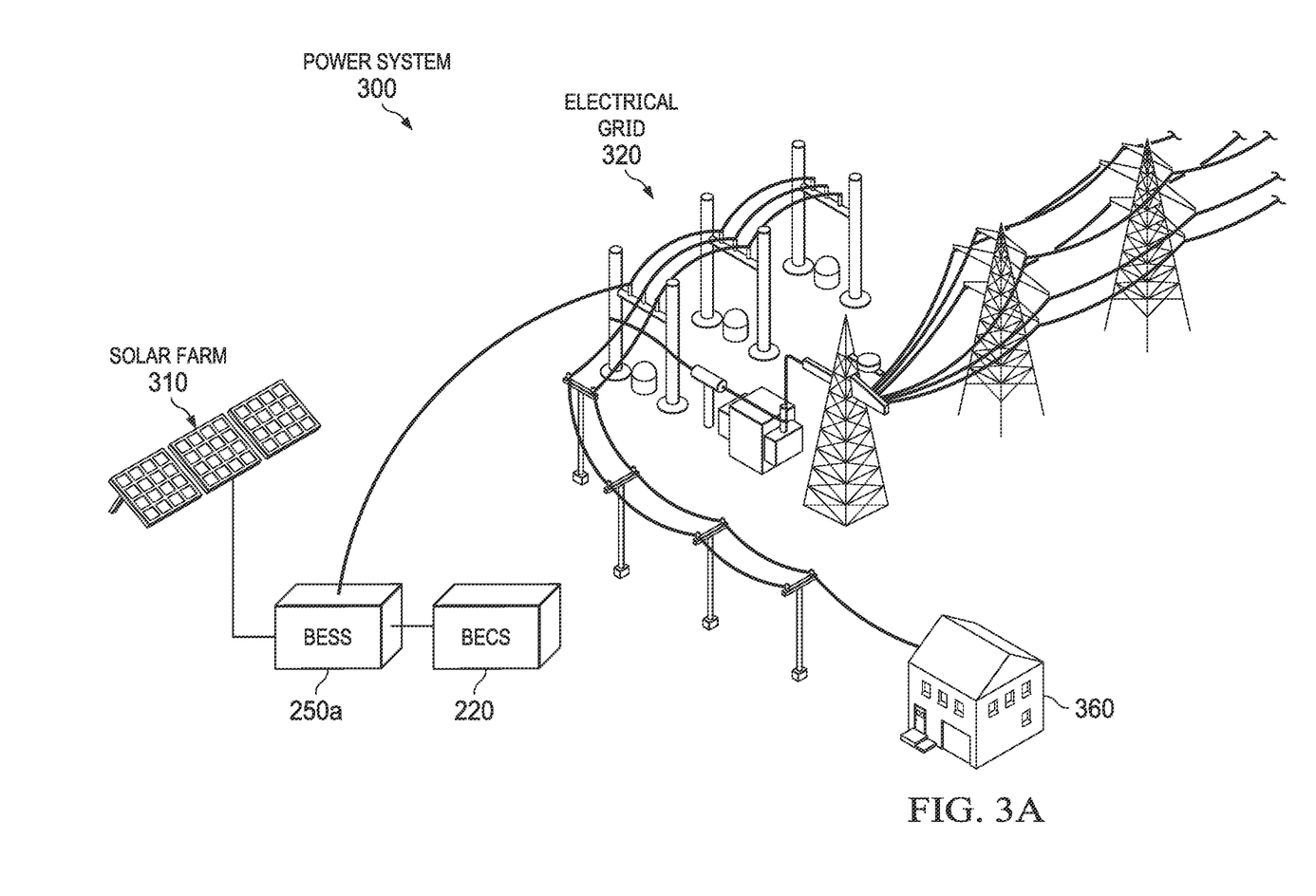
FIG. 3A shows an example power system including a disclosed ECS shown as a BECS, where the BECS is coupled to control the BESS that is shown coupled to an electrical grid.

FIG. 3A shows an example power system 300 including a disclosed ECS shown as a BECS 220, where the BECS 220 is coupled to control the ESS shown as BESS 250a that is shown coupled to an electrical grid 320. The BESS 250a stores energy that is produced by a power generator comprising a conventional energy source or by a renewable energy source such as a wind and solar farm, shown by example as a solar farm 310. Besides a solar farm 310, the power generator thus may also comprise a conventional energy source (e.g., a power plant that burns fossil fuels, such as oil) and/or an alternative energy source besides a solar-based energy source, such as a wind farm. As noted above, although FIG. 3A shows a single BESS, disclosed ECS such as BECS 220 are configured for application situations where there are multiple ESS's, this arrangement comprising multiple BESS.

The electrical grid 320 is shown distributing electrical energy to the public depicted in simplified form as a single house 360. As described above, the BESS 250a includes a plurality of battery packs that can be charged and discharged on demand as controlled by the BECS 220.

Figure 3B:
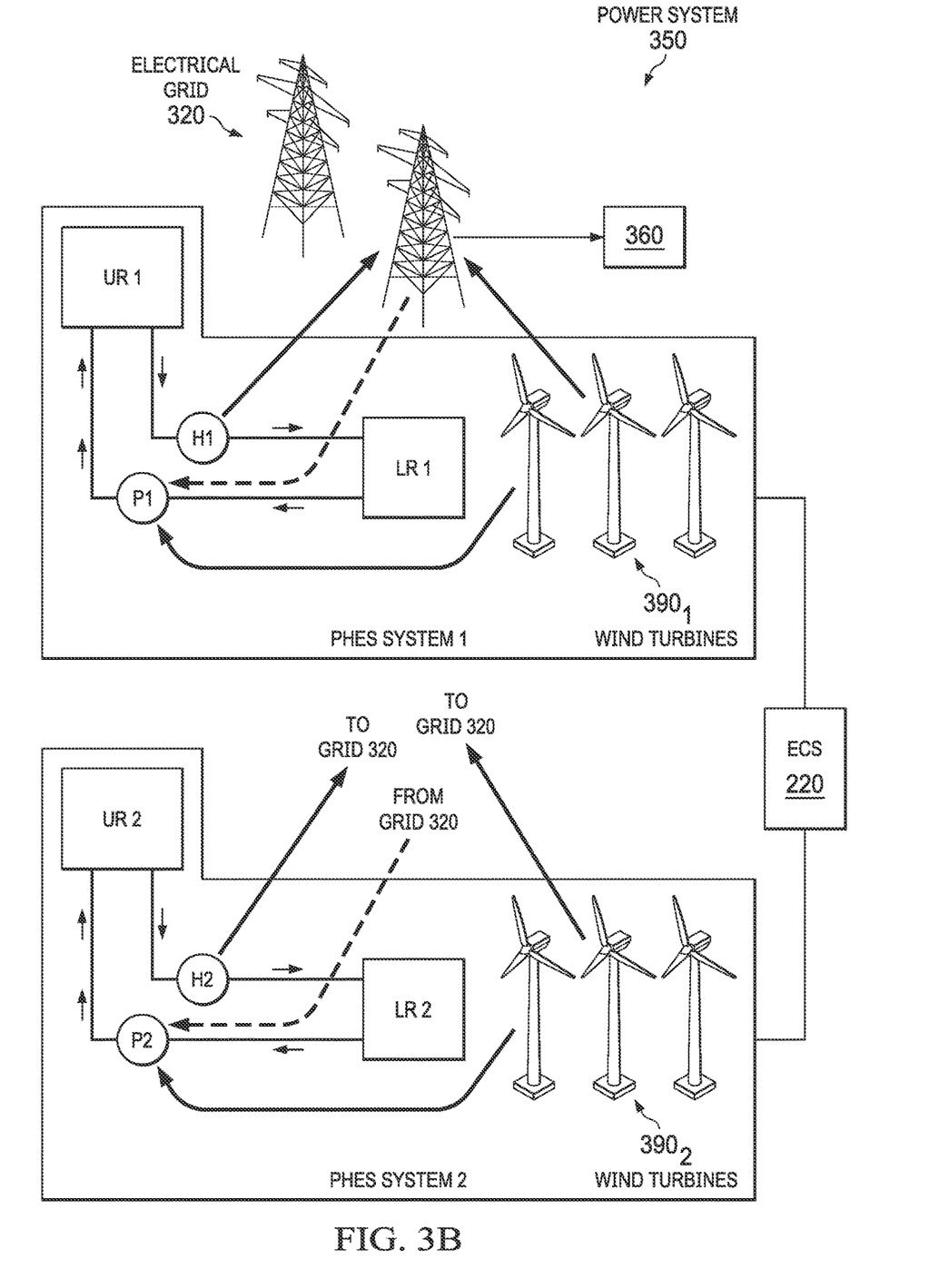
FIG. 3B shows an example power system including a disclosed ECS including a plurality of PHES systems shown as first and second PHES systems, where the ECS is coupled to control the respective PHES systems that are both shown coupled to an electrical grid.

FIG. 3B shows an example power system 350 including a disclosed ECS 220 that includes a plurality of PHES systems, where the ECS 220 is coupled to control the respective PHES systems shown as PHES system 1 and PHES system 2 that are both shown coupled to an electrical grid 320 which supplies electricity to the public shown in simplified form as the house 360. The PHES systems 1 and 2 each include an upper reservoir and a lower reservoir, shown as $UR_1$, $UR_2$, $LR_1$ and $LR_2$, a hydroelectric turbine (H) shown as $H_1$ and $H_2$, and generally a plurality of pumps (P) shown as $P_1$ and $P_2$, utilized to implement the PHES method. The power generators are shown in this FIG. to be a wind turbine $390_1$ as part of PHES system 1 and wind turbine $390_2$ as part of PHES system 2. The PHES systems 1 and 2 have at least one different operating feature. For example, the PHES systems 1 and 2 may differ in their available storage capacity and/or the maximum power they can deliver.

Examples

Disclosed aspects are further illustrated by the following specific Examples, which should not be construed as limiting the scope or content of this Disclosure in any way. Example operator UI's are shown in these examples.

Figure 4:
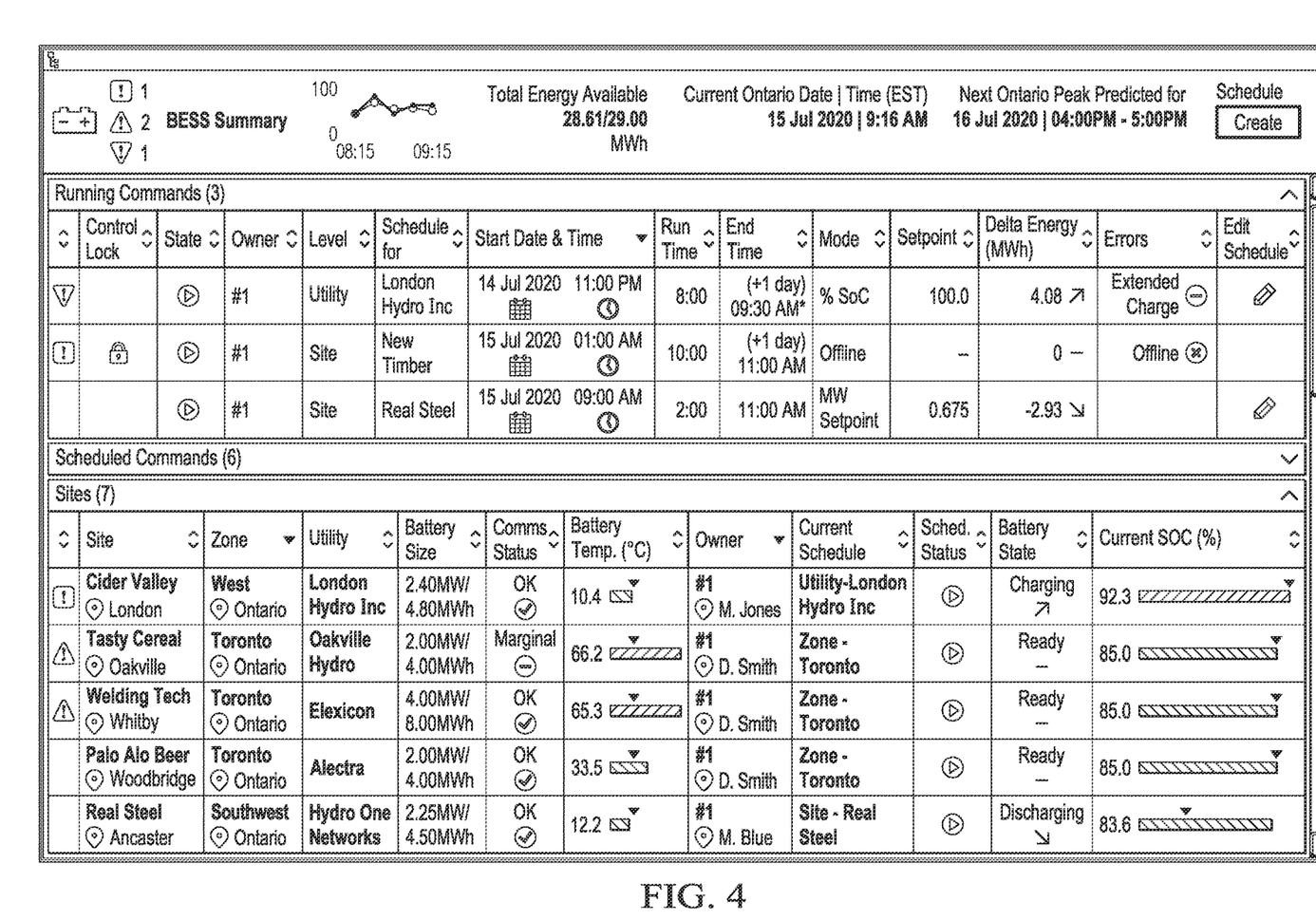
FIG. 4 shows a scanned example screenshot from a user interface (UI) screen associated with a BECS including a list of currently running and scheduled commands, and a summary of the status for the respective BESS. Also shown is a schedule creation UI.
Figure 5:
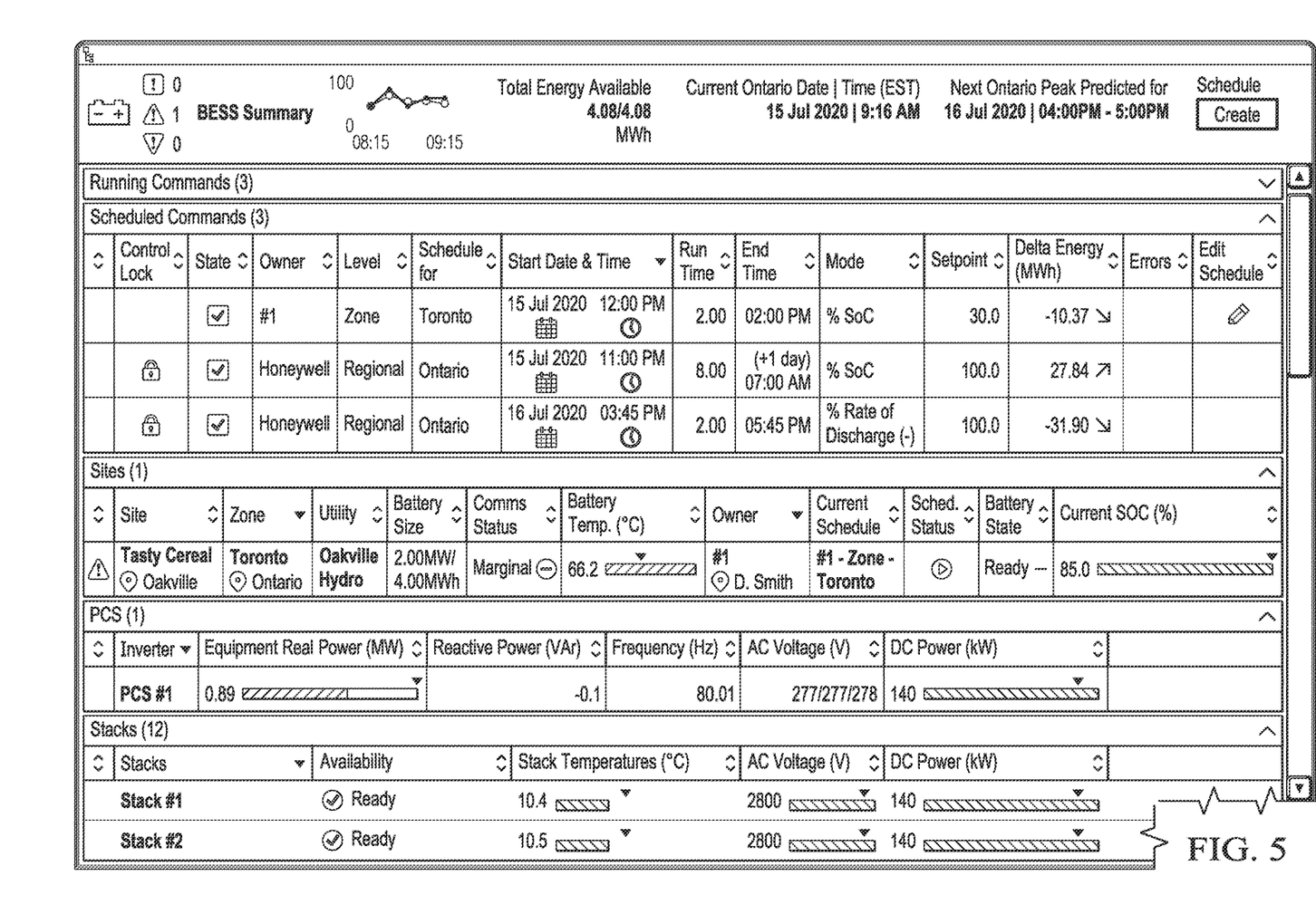
FIG. 5 shows another example screenshot from a UI screen associated with a BECS showing the current status of each battery pack in a BESS having a plurality of battery packs, and a list of running schedule commands

FIG. 4 shows an example of the UI showing a list of currently running and scheduled commands for an example BECS controlling a plurality of different sites, and a summary of the status of the respective BESS at the respective sites. The owner in the FIGs. associated with these Examples is shown as being either "#1" or "Honeywell". FIG. 5 shows an example of a UI associated with a disclosed BECS showing the current status of each of a plurality of battery packs in a BESS, and a list of running schedule commands.

Figure 6:
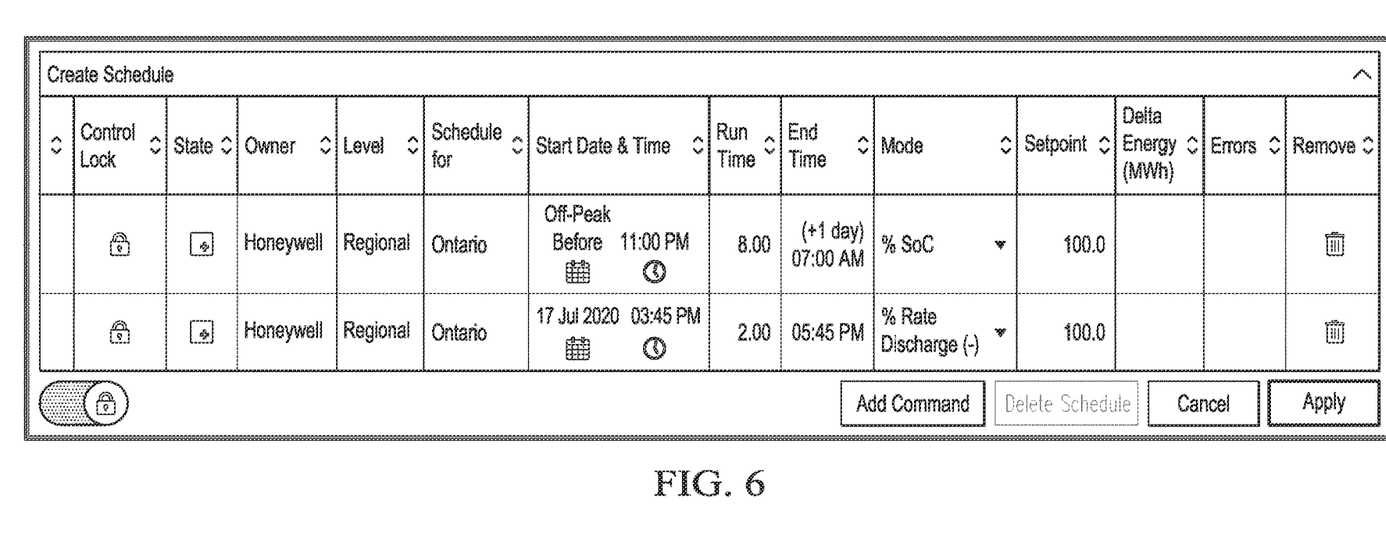
FIG. 6 shows an example charging and discharging schedule showing the action, the associated state of charge, and the time to reach the state of charge for a BESS. For a power system including a plurality of PHES systems, the respective PHES systems may be different.
Figure 7:
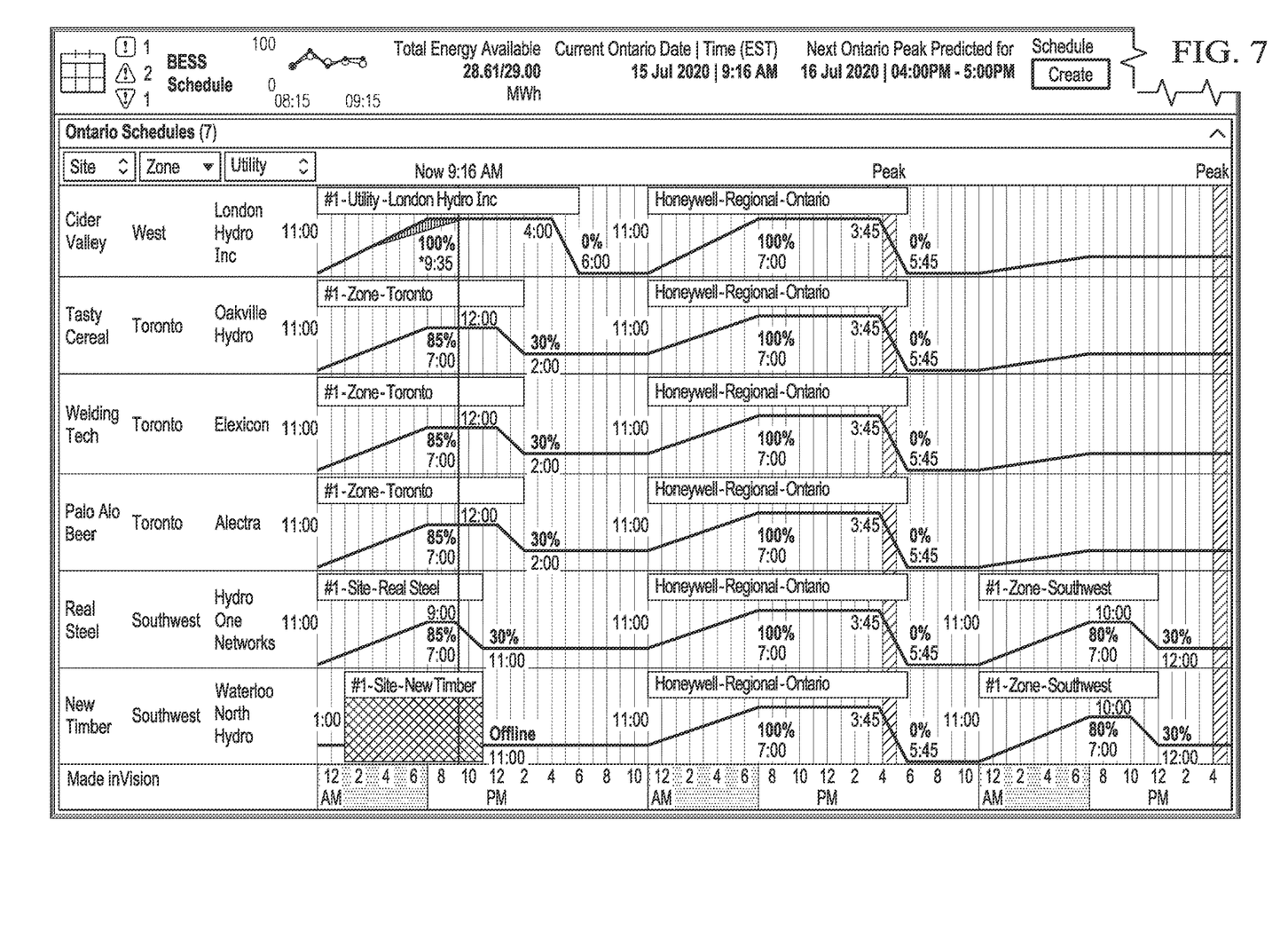
FIG. 7 shows an example battery control dashboard that can be provided on a UI screen for an operator by disclosed aspects.

FIG. 6 shows an example of a UI associated with a disclosed BECS controlling the charging and discharging scheduling, and also showing the action, the associated state of charge, and the time to reach the state of charge for a battery pack. FIG. 7 shows an example battery control dashboard that can be provided on a UI for an operator enabled by disclosed aspects. Disclosed dashboards can display the monitoring of the usage of the respective batteries of a BESS during energy peaks. FIG. 7 also shows a list of BESS's, with a graphical representation of the state of charge (past and future) of each BESS on a timeline. The expected state of charge is defined by the charging and discharging schedule that is applied by the ECS to each BESS.

While various disclosed aspects have been described above, it should be understood that they have been presented by way of example only, and not as a limitation. Numerous changes to the disclosed aspects can be made in accordance with the Disclosure herein without departing from the spirit or scope of this Disclosure. Thus, the breadth and scope of this Disclosure should not be limited by any of the above-described aspects. Rather, the scope of this Disclosure should be defined in accordance with the following claims and their equivalents.

The invention claimed is:

1. An energy control system (ECS) for controlling at least one energy storage system (ESS) that includes at least one energy storage device or an energy storage combination (ESDC), wherein there is at least one of a plurality of the energy storage devices and a plurality of the energy storage combinations, a power conversion system coupled to an output of the ESDC, and a transformer coupled to an output of the power conversion system, the ECS comprising:
an ECS server, and
an ESS adapter coupled between the ECS server and the ESS, wherein the ESS adapter is configured for providing an interface between the ECS server and the ESS including for forwarding communications between the ECS server and the ESS;
wherein the ECS server is configured for:
reading status data from the ESS and submitting schedules including selected charging and discharging times to the ESS;
monitoring or displaying a variance between an expected performance of the ESS based on the schedules and an actual performance of the ESS, wherein the variance between the expected performance and actual performance enables the ESS to be identified to be operating outside of safety limits, and
responsive to the variance being determined to be above a predetermined threshold, sending an update of the schedules to the ESS.

2. The ECS of claim 1, wherein the ECS further comprises at least one operator station, and wherein the ECS is configured to enable a user at the operator station having a graphical user interface (UI) for the monitoring and for generating the update of the schedules.

3. The ECS of claim 1, wherein the at least one ESS comprises a plurality of the ESS located at a plurality of ESS sites, and wherein the ESDC in the plurality of ESS collectively include at least one different energy storage feature or at least one different operating feature.

4. The ECS of claim 3, wherein the plurality of ESS comprises a plurality of battery-based ESS (BESS) each including a plurality of battery packs, wherein the plurality of BESS has at least one of different capacities, different chemistries, different charge rates, different manufacturers, different number of cycles, different safe operating conditions, and different physical locations.

5. The ECS of claim 1, wherein the ECS is configured to provide supporting functions including at least one of schedule locking, and override of schedules by administrators.

6. The ECS of claim 2, wherein the ECS is further configured for a plurality of the ESS to create, edit, or remove the schedules for each of the plurality of ESS.

7. The ECS of claim 1, wherein the ESS adapter utilizes a communication protocol used by the ESS.

8. The ECS of claim 1, wherein the ECS server is configured with algorithms for automatically generating the schedules.

9. The ECS of claim 1, wherein the ESDC comprises the energy storage combination, and wherein the energy storage combination comprises a pumped hydroelectric energy storage (PHES) system comprising an upper reservoir and a lower reservoir, at least one pump for moving water from the lower reservoir to the upper reservoir, and a turbine between the upper reservoir and the lower reservoir coupled to generate electricity from the water when released from the upper reservoir to the lower reservoir.

10. A method of controlling at least one energy storage system (ESS) comprising at least one energy storage device or energy storage combination (ESDC), wherein there is at least one of a plurality of the energy storage devices and a plurality of the energy storage combinations, a power conversion system coupled to an output of the ESDC, and a transformer coupled to an output of the power conversion system, an energy control system (ECS) comprising an ECS server, and an ESS adapter coupled between the ECS server and the ESS, wherein the ESS adapter is configured to provide an interface between the ECS server and the ESS, and to communicate with the ESS;
the method comprising the ECS server:
reading status data from the ESS;
submitting schedules including charging and discharging times to the ESS, and
monitoring or displaying a variance between an expected performance of the ESS based on the schedules and an actual performance of the ESS, wherein the variance between the expected performance and actual performance enables the ESS to be identified to be operating outside of safety limits,
wherein when the variance is determined to be above a predetermined threshold, the ECS server sending an update of the schedules to the ESS.

11. The method of claim 10, wherein the ECS further comprises at least one operator station, and wherein the ECS is configured to enable a user at the operator station having a graphical user interface (UI) for the monitoring and for generating the update of the schedules.

12. The method of claim 10, wherein the at least one ESS comprises a plurality of the ESS, and wherein the ESDC in the plurality of ESS collectively include at least one different energy storage feature or at least one different operating feature.

13. The method of claim 12, wherein the ESDC comprises a plurality of battery-based ESS (BESS) each including a plurality of battery packs, wherein the respective BESS have at least one of different capacities, different chemistries, different charge rates, different manufacturers, different number of cycles, different safe operating conditions, and different physical locations.

14. The method of claim 10, wherein the ECS is configured to provide supporting functions including at least one of schedule locking, and override of schedules by administrators.

15. The method of claim 10, wherein the ECS further comprises at least one operator station, and wherein the ECS is configured to allow a user at the operator station having a graphical user interface (UI) for the monitoring and for generating the update of the schedules for a plurality of the ESS including to create, edit, or remove the schedules for the plurality of ESS.

16. The method of claim 10, wherein the ESS adapter utilizes a communication protocol used by the ESS.

17. The method of claim 10, wherein the ECS server is configured with algorithms for automatically generating the schedules.

18. The method of claim 10, wherein the ESDC comprises the energy storage combination, and wherein the energy storage combination comprises a pumped hydroelectric energy storage (PHES) system comprising an upper reservoir and a lower reservoir, at least one pump for moving water from the lower reservoir to the upper reservoir, and a turbine between the upper reservoir and the lower reservoir coupled to generate electricity from the water when released from the upper reservoir to the lower reservoir.

\* \* \* \* \*